United States Patent
Riemens et al.

(10) Patent No.: US 11,216,962 B2
(45) Date of Patent: Jan. 4, 2022

(54) EFFICIENT IMPLEMENTATION OF JOINT BILATERAL FILTER

(71) Applicant: ULTRA-D COÖPERATIEF U.A., Eindhoven (NL)

(72) Inventors: Abraham Karel Riemens, Eersel (NL); Bart Gerard Bernard Barenbrug, Waalre (NL)

(73) Assignee: ULTRA-D COÖPERATIEF U.A., Eindhoven (NL)

( * ) Notice: Subject to any disclaimer, the term of this patent is extended or adjusted under 35 U.S.C. 154(b) by 70 days.

(21) Appl. No.: 16/604,734

(22) PCT Filed: Apr. 4, 2018

(86) PCT No.: PCT/EP2018/058604
§ 371 (c)(1),
(2) Date: Oct. 11, 2019

(87) PCT Pub. No.: WO2018/189010
PCT Pub. Date: Oct. 18, 2018

(65) Prior Publication Data
US 2021/0192760 A1    Jun. 24, 2021

(30) Foreign Application Priority Data
Apr. 13, 2017   (EP) .................................... 17166455

(51) Int. Cl.
*G06T 7/50* (2017.01)
(52) U.S. Cl.
CPC ...... *G06T 7/50* (2017.01); *G06T 2207/20028* (2013.01)
(58) Field of Classification Search
CPC .................. G06T 7/50; G06T 2207/20028
(Continued)

(56) References Cited

U.S. PATENT DOCUMENTS

| 8,988,317 | B1 * | 3/2015 | Liang ...................... G06T 15/00 345/32 |
| 2002/0122038 | A1 * | 9/2002 | Cowperthwaite ....... G06T 19/20 345/428 |

(Continued)

FOREIGN PATENT DOCUMENTS

| CN | 102055996 A | 5/2011 |
| CN | 103927717 A | 7/2014 |
| RU | 2015101809 A | 8/2016 |

OTHER PUBLICATIONS

International Search Report and Written Opinion for PCT Patent App. No. PCT/EP2018/058604 (dated Jun. 7, 2018).

(Continued)

*Primary Examiner* — Ayodeji O Ayotunde
(74) *Attorney, Agent, or Firm* — Kenealy Vaidya LLP (57) ABSTRACT

Some embodiments are directed to an integrated circuit and computer-implemented method for estimating a depth map from an image using a joint bilateral filter at reduced computational complexity. For that purpose, image data of an image is accessed as well as depth data of a template depth map. A joint bilateral filter is then applied to the template depth map using the image data as a range term in the joint bilateral filter, thereby obtaining an image-adapted depth map as output. The applying of the joint bilateral filter includes initializing a sum-of-weighted-depths volume and a sum-of-weights volume as respective empty data structures in a memory, performing a splatting operation to fill said volumes, performing a slicing operation to obtain an image-adapted depth volume, and performing an interpolation operation to obtain an image-adapted depth value of the image-adapted depth map for each pixel in the image.

15 Claims, 9 Drawing Sheets

(58) Field of Classification Search
USPC .......................................................... 382/106
See application file for complete search history.

(56) References Cited

U.S. PATENT DOCUMENTS

2011/0210969 A1* 9/2011 Barenbrug .............. G06T 7/507
345/419
2015/0269716 A1 9/2015 Leitao

OTHER PUBLICATIONS

Mueller, K., et al., "High-Quality Splatting on Rectilinear Grids with Efficient Culling of Occluded Voxels," IEEE Transactions on Visualization and Computer Graphics, IEEE Service Center, Los Alamitos, CA, US, vol. 5, No. 2, Apr. 1, 1999, pp. 116-134, XP000832311.
Paris, S., et al., "A Fast Approximation of the Bilateral Filter Using a Signal Processing Approach," International Journal of Computer Vision, vol. 81, No. 1, Dec. 18, 2007, pp. 24-52, XP019650170.
Paris, S., et al., "A Fast Approximation of the Bilateral Filter Using a Signal Processing Approach," Network and Parallel Computing [Lecture Notes in Computer Science; Lect. Notes Computer], Springer International Publishing, Cham, May 7, 2006, pp. 568-580, XP047430121.

* cited by examiner

| edgeBinY | 4 | | | | | | | | | |
|---|---|---|---|---|---|---|---|---|---|---|
| sizeBinY | 8 | | | | | | | | | |
| Y position | binY | factorY | wnY | wpy | depth value | weight | w * val | SWD* sum | SW* sum |
| 0 | 0 | 4 | 4 | 4 | | | | | |
| 1 | 0 | 5 | 5 | 3 | | | | | |
| 2 | 0 | 6 | 6 | 2 | | | | | |
| 3 | 0 | 7 | 7 | 1 | | | | | |
| 4 | 1 | 0 | 0 | 8 | 20 | 8 | 160 | 720 | 36 |
| 5 | 1 | 1 | 1 | 7 | 20 | 7 | 140 | | |
| 6 | 1 | 2 | 2 | 6 | 20 | 6 | 120 | | |
| 7 | 1 | 3 | 3 | 5 | 20 | 5 | 100 | | |
| 8 | 1 | 4 | 4 | 4 | 20 | 4 | 80 | | |
| 9 | 1 | 5 | 5 | 3 | 20 | 3 | 60 | | |
| 10 | 1 | 6 | 6 | 2 | 20 | 2 | 40 | | |
| 11 | 1 | 7 | 7 | 1 | 20 | 1 | 20 | | |
| 12 | 2 | 0 | 0 | 8 | 0 | 0 | 0 | 560 | 28 |
| 13 | 2 | 1 | 1 | 7 | 20 | 1 | 20 | | |
| 14 | 2 | 2 | 2 | 6 | 20 | 2 | 40 | | |
| 15 | 2 | 3 | 3 | 5 | 20 | 3 | 60 | | |
| 16 | 2 | 4 | 4 | 4 | 20 | 4 | 80 | | |
| 17 | 2 | 5 | 5 | 3 | 20 | 5 | 100 | | |
| 18 | 2 | 6 | 6 | 2 | 20 | 6 | 120 | | |
| 19 | 2 | 7 | 7 | 1 | 20 | 7 | 140 | | |
| 20 | 3 | 0 | 0 | 8 | | | | | |
| 21 | 3 | 1 | 1 | 7 | | | | | |

Fig. 4

| edgeBinY | 4 | | | | | | |
|---|---|---|---|---|---|---|---|
| sizeBinY | 8 | | | | | | |
| Y position | binY | factorY | wmy | wpy | D* value | weight | intpl. Dout |
| 0 | 0 | 4 | 4 | 4 | | | |
| 1 | 0 | 5 | 5 | 3 | | | |
| 2 | 0 | 6 | 6 | 2 | | | |
| 3 | 0 | 7 | 7 | 1 | | | |
| 4 | 1 | 0 | 0 | 8 | 24 | 8 | 24 |
| 5 | 1 | 1 | 1 | 7 | | 7 | 22 |
| 6 | 1 | 2 | 2 | 6 | | 6 | 20 |
| 7 | 1 | 3 | 3 | 5 | | 5 | 18 |
| 8 | 1 | 4 | 4 | 4 | | 4 | 16 |
| 9 | 1 | 5 | 5 | 3 | | 3 | 14 |
| 10 | 1 | 6 | 6 | 2 | | 2 | 12 |
| 11 | 1 | 7 | 7 | 1 | | 1 | 10 |
| 12 | 2 | 0 | 0 | 8 | 0 | 0 | |
| 13 | 2 | 1 | 1 | 7 | | 1 | |
| 14 | 2 | 2 | 2 | 6 | | 2 | |
| 15 | 2 | 3 | 3 | 5 | | 3 | |
| 16 | 2 | 4 | 4 | 4 | | 4 | |
| 17 | 2 | 5 | 5 | 3 | | 5 | |
| 18 | 2 | 6 | 6 | 2 | | 6 | |
| 19 | 2 | 7 | 7 | 1 | | 7 | |
| 20 | 3 | 0 | 0 | 8 | | | |
| 21 | 3 | 1 | 1 | 7 | | | |

EFFICIENT IMPLEMENTATION OF JOINT BILATERAL FILTER

CROSS REFERENCE TO RELATED APPLICATIONS

This application is a national phase filing under 35 C.F.R. § 371 of and claims priority to PCT Patent Application No. PCT/EP2018/058604, filed on Apr. 4, 2018, which claims the priority benefit under 35 U.S.C. § 119 of European Patent Application No. 17166455.0, filed on Apr. 13, 2017, the contents of each of which are hereby incorporated in their entireties by reference

BACKGROUND

The presently disclosed subject matter relates to an integrated circuit configured to estimate a depth map from an image using a joint bilateral filter. The presently disclosed subject matter further relates to a method for estimating a depth map from an image using a joint bilateral filter, and to a computer readable medium including transitory or non-transitory data representing instructions arranged to cause a processor system to perform the method.

Display devices such as televisions, tablets and smartphones may include a 3D display to provide a user with a perception of depth when viewing content on such a device. For that purpose, such 3D displays may, either by themselves or together with glasses worn by the user, provide the user with different images in each eye so as to provide the user a perception of depth based on stereoscopy.

3D displays typically require content which contains depth information. The depth information may be provided implicitly in the 3D content. For example, in the case of stereoscopic content, in short also referred to 'stereo' content, the depth information is provided by the differences between a left image and a right image. The depth information may also be provided explicitly in the 3D content. For example, in 3D content encoded in the so-termed image+depth format, the depth information is provided by a depth map which may include depth values, disparity values and/or parallactic shift values, with each of the values being indicative of the distance that objects in the image have towards the camera.

A great amount of content that is currently available, e.g., movies, television programs, images, etc., is 2D content. Such content needs to be converted to 3D in order to enable its 3D rendering on a 3D display. Conversion to 3D may include generating a depth map for a 2D image, e.g., for each 2D image of a 2D video. In general, this process is referred to as '2D to 3D conversion', and may involve creating the depth map manually. For example, a software tool running on a workstation may offer a professional user the possibility to add depth to 2D images by drawing depth maps using a digital pen. The depth map may also be generated automatically. For example, a device may estimate the distance that objects within the 2D image have towards the camera and, based thereon, generate a depth map for the 2D image.

An example of the automatic generation of a depth map is known from U.S. Pat. No. 8,447,141, which describes a method of generating a depth map for an image using monocular information. The method includes generating a first depth map for the image which provides a global depth profile, and which may be a simple generic template such as a slant. Moreover, a second depth map is generated which is based on the depth values of the first depth map and color and/or luminance values of the image. The generating of the second depth map may involve applying a joint bilateral filter to the first depth map using range information from the image. It is said that as a result, objects will be made more distinct from the global depth profile.

Effectively, U.S. Pat. No. 8,447,141 uses the joint bilateral filter to adapt the generic template provided by the depth map to the actual content of the image.

However, the implementation of a joint bilateral filter is computationally complex. The publication "A fast approximation of the bilateral filter using a signal processing approach" by Paris et al., International Journal of Computer Vision 81.1, 2009, pp. 24-52, describes an approximation of the joint bilateral filter which is said to be less computationally complex. Disadvantageously, the described approximation of the bilateral filter is still relatively computationally complex, and thus not well suited for cost-efficient implementation in consumer devices, e.g., in an integrated circuit.

SUMMARY

One of the objects of the presently disclosed subject matter is to obtain an integrated circuit configured to estimate a depth map from an image using a joint bilateral filter, which is less computationally complex than the approximation described by Paris et al.

A first aspect of the presently disclosed subject matter provides an integrated circuit configured to estimate a depth map from an image, wherein the integrated circuit is defined by claim 1. A further aspect of the presently disclosed subject matter provides a computer-implemented method for estimate a depth map from an image, wherein the method is defined by claim 14 Essentially, the integrated circuit implements the joint bilateral filter at a coarser resolution, but in a different manner than Paris et al. One of the advantageous differences is that Paris et al. first perform an interpolation and then a slicing operation, with the latter involving division. The division in Paris et al. is thus performed on data having been interpolated back to full-resolution. The integrated circuit as claimed performs a slicing operation on the down-sampled volumes, so at a greatly reduced resolution. For example, if volumes of, e.g., 18×12×18 (height×width×range) are used, only 3,888 division operations may be needed, which are far fewer than would be needed to perform a division on, e.g., a 480×270 image (129.600 division operations). It has been found that the quality reduction of performing the slicing operation on the down-sampled volumes is very limited. However, since division operations are computationally complex to implement, the computational burden of performing the joint bilateral filter is greatly reduced. This allows the splicing operation to be performed in software, which further yields flexibility with respect to its implementation.

It is noted that the depth map which is used as input may be a template depth map, and thereby correspond to a predetermined generic depth profile such as a slant, or a generic depth profile which is selected from a list of different generic depth profiles as best or better matching the content of the image. However, in general, the depth map may be any depth map which benefits from being further adapted to the image.

It is further noted that the volumes may be three-dimensional volumes, e.g., being constituted by down-sampled versions of the two-spatial dimensions of the image and a down-sampled version of the range dimension of one of the components of the image, e.g., the luminance component. Alternatively, the volumes may include two or more range dimensions, which may correspond to two or more of the components of the image, e.g., the luminance and one or more chrominance components of a YUV image, or the individual color components of a RGB image, etc.

Optionally, the processing subsystem includes an application-specific hardware circuit and a microprocessor configurable by software, wherein:

the application-specific hardware circuit is configured to perform the splatting operation and the interpolation operation; and the microprocessor is configured by the software to, during operation of the integrated circuit, perform the slicing operation.

This aspect of the presently disclosed subject matter is based on the insight that while the splatting operation and the interpolation operation are both still relatively computationally complex, the slicing operation has been significantly reduced in complexity compared to Paris et al. by solely operating on the down-sampled volumes. As such, the slicing operation may be performed in software, yielding flexibility, whereas the splatting operation and the interpolation operation may be performed in hardware in view of the generally higher efficiency of a hardware implementation versus software.

Optionally, the application-specific hardware circuit includes a filter table for storing the splatting weights used in the splatting operation and/or the interpolation weights used in the interpolation operation. In case the splatting operation and the interpolation operation are hardware operations, the weights may be stored in a filter table of the hardware circuit, which may be a read-only memory or a random-access memory. This enables the weights to be readily accessible by the hardware of the respective operations.

Optionally, the filter table is loaded with the splatting weights used in the splatting operation and the interpolation weights used in the interpolation operation before performing the respective operation. In case different weights are used for the splatting operation than for the interpolation operation, these weights may be loaded into the filter table before the respective operation is performed, e.g., by the microprocessor. In this way, the hardware of the filter table is re-used and not separately implemented for both the hardware of the splatting operation and the hardware of the interpolation operation. It is noted that in addition or alternatively to the re-use of the hardware of the filter table between the splatting and the interpolation operation, in general there may also be re-use of hardware for determining the relative position of a sample within a bin between the splatting and the interpolation operation.

Optionally, the splatting weights used in the splatting operation and the interpolation weights used in the interpolation operation are the same. This aspect of the presently disclosed subject matter is based on the insight that the same weights may be used for performing the splatting operation as for performing the interpolation operation since both are essentially similar operations which in the present context also operate on, on the one hand, the image, and on the other hand, a multi-dimensional volume having down-sampled dimensions with respect to the two spatial dimensions and the range dimension of the image. By using the same weights, the implementation of both operations is considerably more efficient.

Optionally, the splatting weights used in the splatting operation and the interpolation weights used in the interpolation operation represent a linear interpolation with respect to the coordinate system of the image. The weights are thus chosen so that a linear interpolation is applied to the data in the respective volumes of the splatting operation and the interpolation operation along each of the dimensions of the volumes. For example, for a three-dimensional volume, a tri-linear interpolation may be used, while for a quad-dimensional volume, e.g., having two range dimensions, a quad-linear interpolation may be used. Linear interpolation has been found to be well-suited for the spatting operation and the interpolation operation. Alternatively, a higher-order interpolation may be used in each dimension, including but not limited to a cubic interpolation.

Optionally, the microprocessor is configured by the software to, during operation of the integrated circuit, apply a temporal filtering to the sum-of-weighted-depths volume and to the sum-of-weights volume before performing the slicing operation. Temporal filtering is often applied to depth maps to ensure temporal stability. Instead or additionally to applying such temporal filtering to the depth map, the volumes which are used for generating the depth map themselves may be temporally filtered. This has been found to yield a more temporally stable depth map, while being computationally efficient to implement to the relatively small size of the volumes compared to an image. For example, a typical volume of 18×12×18 contains 3,888 data values to be filtered, whereas an image of 480×270 contains 129,600 data values to be filtered. Due to the filtering being specifically applied to the volume(s), a software implementation is possible. Advantageously, it has been found that applying an Infinite Impulse Response (IIR) filter to the sum-of-weighted-depths volume improves the temporal stability of the resulting depth map in case of so-termed shot-cuts, without a need for dedicated shot-cut processing, e.g., involving dedicated shot-cut detectors. The temporal filtering may, for example, be a first- or higher-order infinite impulse response filter, and may be implemented as part of other (non-linear) operations on the volume data.

Optionally, the microprocessor is configured by the software to, during operation of the integrated circuit, apply a temporal filtering to the image-adapted depth volume. Such temporal filtering offers comparable reductions in computational complexity compared to the filtering of an actual image as described with respect to the filtering of the sum-of-weighted-depths volume or the sum-of-weights volume. The temporal filtering may be of a same type as described with respect to the filtering of the sum-of-weighted-depths volume or the sum-of-weights volume.

Optionally, the processing subsystem is configured to, after performing the splatting operation, convolute the sum-of-weighted-depths volume with a Gaussian kernel. It has been found that such a convolution improves the quality of the depth map.

Optionally, the template depth map has a reduced spatial resolution with respect to the image, e.g., having two spatial dimensions corresponding to the two spatial dimensions of the sum-of-weighted-depths volume and the sum-of-weights volume. The template depth map may then be interpolated using the same weights as used in the splatting operation.

Optionally, the joint bilateral filter may be applied to only to luminance data of the image. Optionally, the joint bilateral filter is applied to the luminance data and chrominance data of the image. In the latter case, the volumes may be five-dimensional volumes having three range dimensions, e.g., a Y, U and V dimension.

Optionally, the integrated circuit is, or is part of, a field-programmable gate array or a system on chip. The integrated circuit may be part of a device such as a display device or set-top box, but also other devices in which it may be used to convert 2D video to 3D video by estimating the depth map.

A further aspect of the presently disclosed subject matter provides a computer readable medium including transitory or non-transitory data representing instructions arranged to cause a processor system to perform the method.

It will be appreciated by those skilled in the art that two or more of the above-mentioned embodiments, implementations, and/or aspects of the presently disclosed subject matter may be combined in any way deemed useful.

Modifications and variations of the method which correspond to the described modifications and variations of the integrated circuit can be carried out by a person skilled in the art on the basis of the present description.

BRIEF DESCRIPTION OF THE DRAWINGS

These and other aspects of the presently disclosed subject matter are apparent from and will be elucidated with reference to the embodiments described hereinafter. In the drawings, FIG. 1 schematically shows an integrated circuit which is configured to estimate a depth map from an image in a computationally efficient manner.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

010 image data
020 depth volume input data
022 depth output data
024 template depth data
026 interpolated template depth data
030 sum of weights volume data
032 sum of weighted depth volume data
052 weight and volume index data
054 weight data
100 processing subsystem of integrated circuit
110 image data input interface
120 depth volume data input interface
122 depth data output interface
130-132 volume data output interface
140 splatting block
150 weighting block
160 interpolation block
170 2D interpolation block
180 control logic
200 image
210 horizontal dimension
220 vertical dimension
250 mapping of bright image patch
260 mapping of dark image background
300 volume representation of image
310 horizontal dimension
320 vertical dimension
330 range dimension
400 dimension (horizontal, vertical or range)
410 series of depth samples
420 splat accumulation interval
430 weight function
440 bin interval
442 edge bin
444 non-edge bin
500 method for estimating depth map from image
510 accessing image data
520 accessing depth data
530 applying joint bilateral filter
540 initializing volumes
550 splatting operation
560 slicing operation
570 interpolation operation
600 computer readable medium
610 non-transitory data representing instructions

DETAILED DESCRIPTION OF EXEMPLARY EMBODIMENTS

Figure 1:
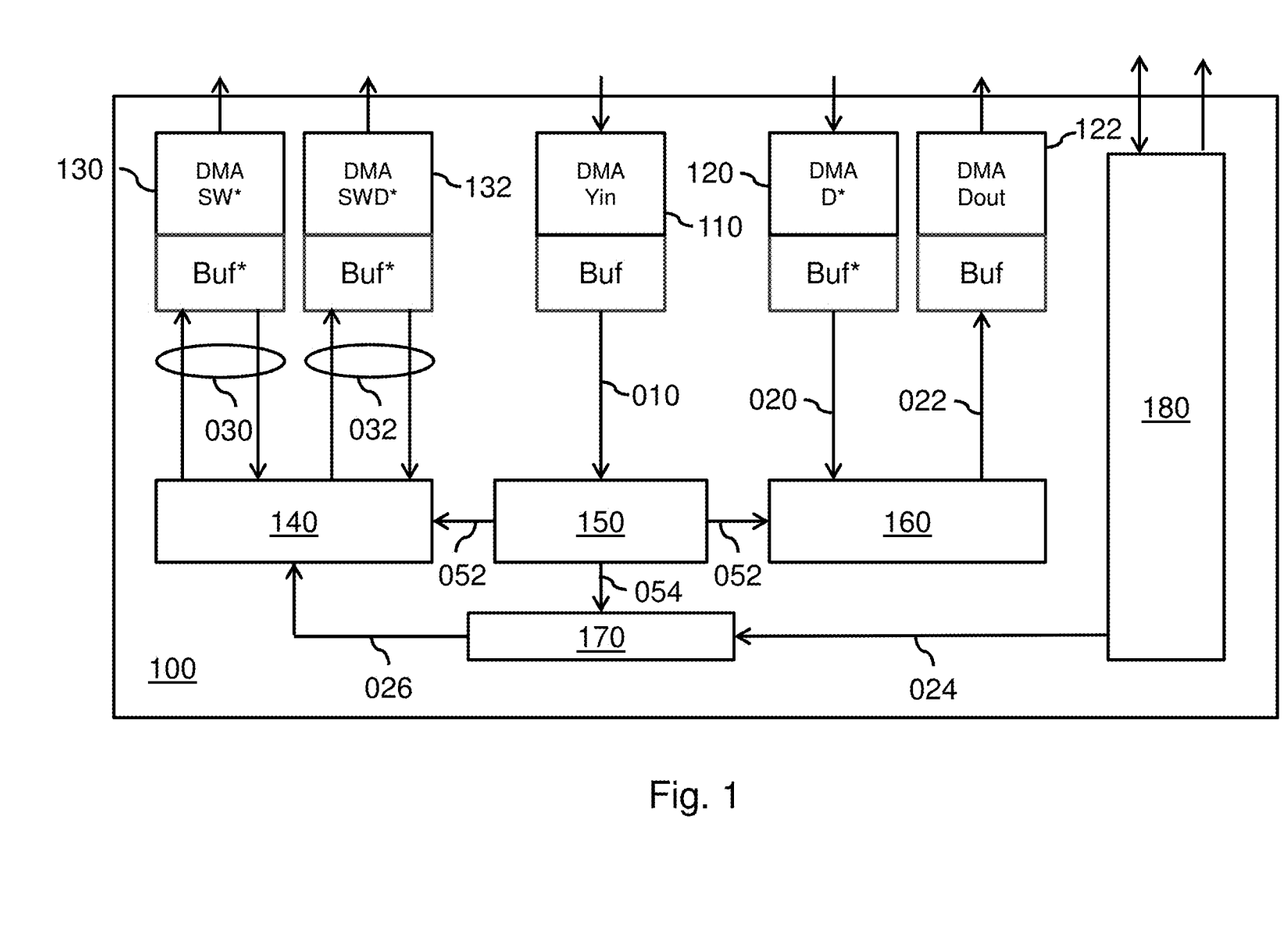

FIG. 1 schematically shows a processing subsystem 100 of an integrated circuit which is configured to estimate a depth map from an image in a computationally efficient manner. The processing subsystem 100 is shown as a functional block diagram, and may be embodied by components such as a microprocessor, an application-specific hardware circuit and one or more local memories. The integrated circuit may include other components which are not shown in FIG. 1, including but not limited to other microprocessors, a bus system, other memories, etc. In general, the integrated circuit may be implemented as, or as part of, a field-programmable gate array (FPGA) or a System-on-Chip (SoC) or in any other suitable manner.

The processing subsystem 100 is shown to include an image data input interface 110 via which image data 010 may be read from a memory, e.g., via Direct Memory Access (DMA) communication. For example, the image data may be luminance input data $Y_{in}$. In this respect, it is noted that the image data input interface 110 and other interfaces of the processing subsystem 100 may include or be connected to a local memory acting as buffer, labeled Se throughout FIG. 1.

The processing subsystem 100 is further shown to include a depth volume data input interface 120 via which depth volume data 020 may be read from the memory, and a depth data output interface 122 via which depth data 022 may be written to the memory. The processing subsystem 100 is further shown to include respective volume data output interfaces 130, 132 for writing sum of weights volume data 030 and sum of weighted depth volume data 032 to the memory.

Other functional blocks of the processing subsystem 100 include a splatting block 140 which communicates with the volume data output interfaces 130, 132, an interpolation block 160 which communicates with the depth data interfaces 120, 122, a weighting block 150 which communicates with the image data input interface 110 and provides weight and volume index data 052 to the splatting block 140 and the interpolation block 160, a 2D interpolation block 170 which receives template depth data 024 from control logic 180 and weight data 054 from the weighting block 150 and provides interpolated template depth data 026 to the splatting block 140.

In an embodiment, the processing subsystem 100 as shown in FIG. 1 may be implemented as an application-specific hardware circuit. In addition, a separate microprocessor (not shown in FIG. 1) may be provided in the integrated circuit which is configured to perform a slicing operation, as also discussed onwards. For that purpose, the microprocessor may have access to the memory, e.g. via DMA. Alternatively, the slicing operation may also be implemented by the application-specific hardware circuit.

The operation of the processing subsystem 100 and its functional blocks will be further explained with reference to FIGS. 2-7. In this respect, it is noted that in FIG. 1 the "*" denotes a local buffer or an interface that is associated with a volumetric multi-dimensional data representation, as explained with reference to FIG. 2.

Figure 2:
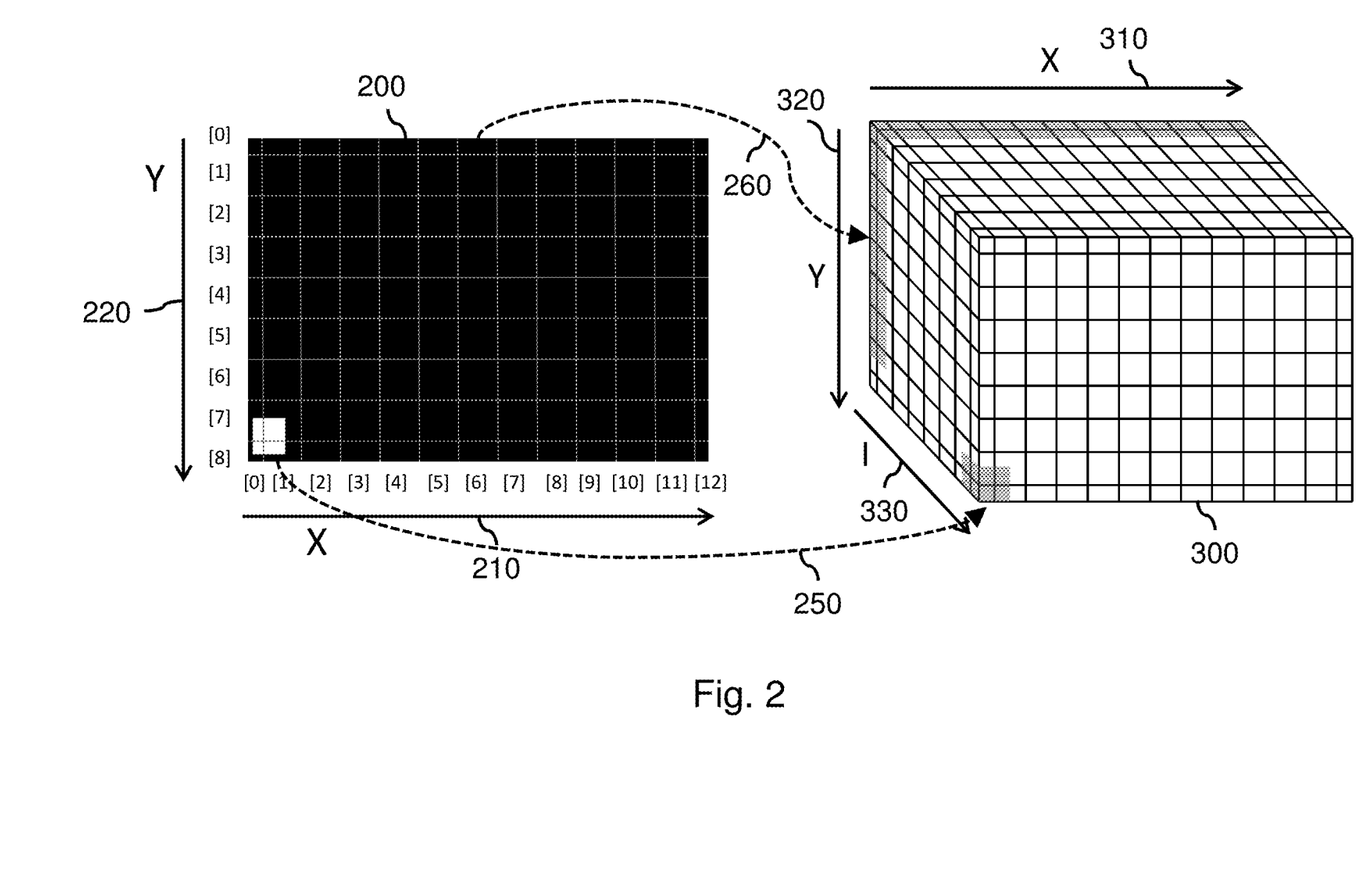
FIG. 2 illustrates the relationship between an image and a volume which may be used to accumulate weights and weighted depth values during a splatting operation and which may hold depth values for an interpolation operation.

FIG. 2 illustrates the relationship between an image 200 and a volume 300, with such type of volume being used for accumulating weights and weighted depth values during a splatting operation and holding depth value of pixels of the image 200 for an interpolation operation. The volume 300 is shown to have three dimensions. The X dimension 310 may correspond to the horizontal axis 210 of the image 200. The Y dimension 320 may correspond to the vertical axis 220 of the image 200. The I dimension 330 may correspond to the range dimension of the image, e.g., of an image component of the image 200 such as but not limited to a luminance component. The volume 300 may have a size which is sub-sampled with respect to the spatial dimensions and the range dimensions of the image 200. For example, while the image 200 may have spatial dimensions of 480 pixels by 270 lines (X, Y) and a 8-bit range dimension (I) defining a range of 256 values, the volume 300 may have dimensions of 18×12×18 (X, Y, I), that is 18×12 (X, Y) for the spatial dimensions 310, 320 and 18 (I) for the range dimension 330.

The cells of the volume 300 may represent bins. During a splatting operation, such bins may define accumulation intervals for the accumulation of depth information of the image 200. Here, the bins used in the accumulation of a weight or weighted depth value associated with a particular pixel are selected as a function of the spatial coordinate of the pixel and its range value. For example, the luminance values of the image 200 may determine the coordinate of the bin along the I dimension 330 of the volume 300, in that the depth information of dark image content may be accumulated in 'lower' bins of the volume 300, as illustrated by the arrow 260, whereas the depth information of bright image content may be accumulated in 'higher' bins of the volume 300, as illustrated by the arrow 250. In addition, the spatial location of the image content may define the location of the bin along the spatial dimensions 310, 320 of the volume 300. Accordingly, the combination of spatial coordinate and range value of a pixel of the image 200, i.e., the coordinate of the pixel in the (at least) 3D coordinate system of the image, may determine in which bin(s) of the volume 300 a weight or a weighted depth value is accumulated during a splatting operation, or which bin(s) hold the depth value of a pixel for interpolation by an interpolation operation.

This determining of bins may essentially involve mapping the pixel's spatial coordinate and range value to a coordinate in the volume's coordinate space and on the basis of its relative position in the volume identifying bins to be used during the splatting and interpolation. Effectively, during splatting, adjacent bins may be identified to determine to which bins the pixel contributes on the basis of its splatting footprint (with the 'contribution' being the accumulation of the weight or weighted depth value), while during interpolation, adjacent bins may be identified to determine between which bins the interpolation is to be performed on the basis of the pixel's relative position within a volume. For that purpose, a mapping function may be used which maps the pixel's spatial coordinate and range value to a coordinate in the volume's coordinate space, with the latter coordinate then being directly indicative of the adjacent bins.

Due to the sub-sampling, multiple pixels of the image 200 may contribute to a single bin of the volume 300, in that their depth values may, at least in part, be accumulated in the single bin. Conversely, a single pixel may contribute to several bins of the volume 300 as its coordinates in the volume's coordinate system may lie in between several cells of the volume 300. As such, when accumulating the pixel's depth value in the volume 300, the depth value may have to be weighted to account for the contribution to several cells of the volume 300. This is also referred to as 'splatting'.

Figure 3A:
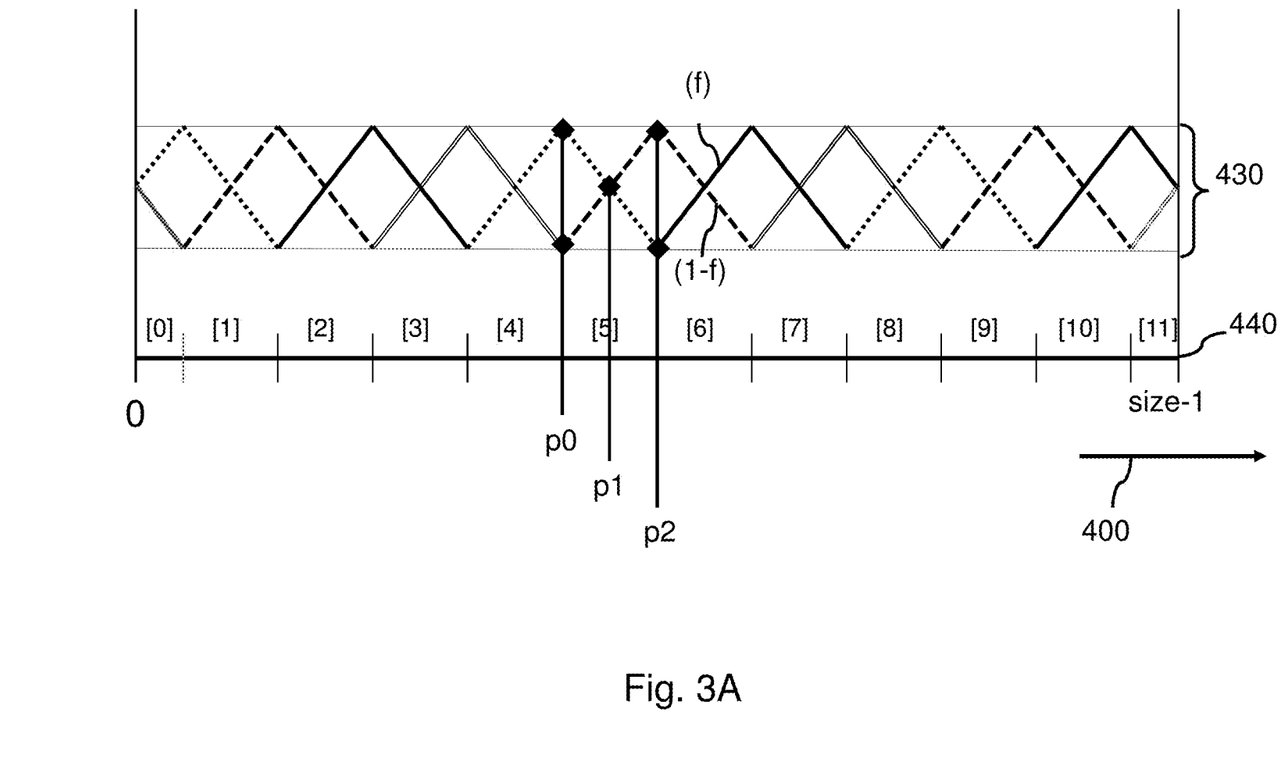
FIG. 3A shows a simplified example of a splatting operation.

FIG. 3A illustrates such a splatting operation along a single dimension K 400. This dimension K may be the horizontal (X), the vertical (Y), or the luminance (I) dimension. For this explanation, the dimension K 400 is considered to represent the luminance dimension I. First, this dimension is divided into bins 440, e.g., by sub-sampling of the luminance dimension I, e.g., from 256 values (8 bit, 0 to 255) down to sixteen bins of width 16. As is known per se, each bin is a storage element that may hold a particular value or a sum of accumulated values. It is noted that for illustration purposes, and in particular to improve the visibility of the Figures, in FIG. 3A and the following, a binning is shown which may only involve twelve bins in total: ten 'normal' bins [1] to [10] and two so-called 'edge bins' [0] and [11]. Note that the different size and purpose of edge bins [0] and [11] will be explained with further reference to FIG. 3B.

The following illustrates the splatting operation with reference to a histogram operation. A conventional histogram may be obtained as follows: for each pixel of an image, it may be determined within which single bin its luminance value falls. Then, the value of that bin may be incremented, e.g., by 1. As a result, the relative position of the luminance value with respect to the luminance interval associated with the bin may be irrelevant. For example, if a bin defines a luminance interval of [0 . . . 7] for accumulation, all or most luminance values which fall within this bin may cause a same increment, namely by 1, irrespective of whether the luminance value falls within a center of the bin (e.g., luminance values 3 and 4) or at an edge of the bin (e.g., luminance values 0 and 7).

Splatting techniques may be used to obtain a better, e.g., more accurate histogram representation. Namely, the relative position of a luminance value within a bin may be taken into account by weighting. In such splatting techniques, the contribution of the pixel being 'splat' may be determined by explicitly or implicitly assigning a footprint to the coordinate of the pixel along the luminance dimension, e.g., to the luminance value. An accumulation by splatting may be performed as follows: for a luminance value of a pixel, it is determined to which adjacent bins the pixel contributes, with 'contributing' referring to a bin falling at least in part within the footprint of the pixel. The values in the adjacent bins may then be incremented by respective weights which depend on the relative position of the luminance value with respect to the two bins. For example, when the luminance value falls centrally within a 'present' bin, the contribution to that bin may be 'high' whereas the contribution to the 'previous' (lower) bin and to the 'next' (higher) bin may be low. Similarly, when a luminance value falls in between two bins, the contribution to each bin may be half of the 'high' value.

The aforementioned position-dependent weighting may embody such a footprint-based contribution to bins. It is noted that since the weighting may only define a contribution to a bin within a particular interval, this interval may also be considered to represent the 'accumulation interval' of the particular bin. For example, the accumulation interval of the 'present' (or 'current') bin may be considered to include the present bin while also extending halfway into the previous bin and the next bin. Thus, starting halfway in the previous bin, the contribution to the present bin may slowly increase from zero to a maximum centrally within the present bin and then slowly decrease to zero halfway in the next bin.

As a result of the use of the splatting operation, the accumulated values in the bins may represent a more accurate representation of a histogram.

In a specific and efficient implementation of the splatting operation, the footprint is considered to contribute at the most to two adjacent bins, e.g., by having a size with corresponds to the size of a bin or being smaller. In this case, a pixel contributes at the most to a bin [n] and a bin [n+1], with n being a bin index or coordinate in the coordinate system of the volume. The first bin may in the following be referred to as the 'present' bin and the second bin may be referred to as the 'next' bin.

A particularly specific and efficient implementation defines the accumulation intervals of the bins such that the contribution of a pixel within the present bin may only be to the present bin and the next bin. This implementation, however, may be considered to have an 'offset' of half a bin to where one would intuitively understand the contribution of a pixel to lie. Namely, in this specific implementation, a maximum contribution to a bin is not obtained in the middle of the bin but at its lowest boundary. A reason for defining the bins in this manner is to allow more hardware re-use between the splatting operation and the interpolation operation, e.g., when considering the calculation and storing of weights and/or the calculation of relative positions with respect to a bin.

As an example, consider in FIG. 3A the case of a luminance value p0, which is a luminance value at the left side of bin [5]. This relative position may contribute a 'high' weight to bin [5] according to the weighting function 430 (dotted line being at/near maximum) and a 'low' weight to bin [6] (dashed line being at/near zero). Next, consider the case of a luminance value p1, which is in the middle of bin [5]. This relative position may contribute an equal weight (half of the 'high' weight) to bins [5] and [6]. Finally, consider the case of a luminance value p2 at the right side of bin [5]. This relative position may contribute a 'low' weight to bin [5] and a 'high' weight to bin [6]. Accordingly, the relative position of the luminance value may determine the weight by which the luminance value is accumulated in the present and next bin. The example of FIG. 3A thereby illustrates a linear 'fade-over' from a maximum contribution to bin [5] to a maximum contribution to bin [6] depending on the luminance value.

It will be appreciated that in this specific and efficient implementation in which a pixel, having a luminance value within the present bin, may contribute only to the present bin and the next bin, the accumulation interval associated with bin [5] may be the interval spanning bin [5] and its previous bin, e.g., the interval corresponding to the dotted line covering bins [4] and [5] in FIG. 3A. Likewise, the accumulation interval associated with bin [6] may be the interval spanning bin [6] and its previous bin, e.g., the interval corresponding to the dashed line covering bins [5] and [6] in FIG. 3A.

Figure 3B:
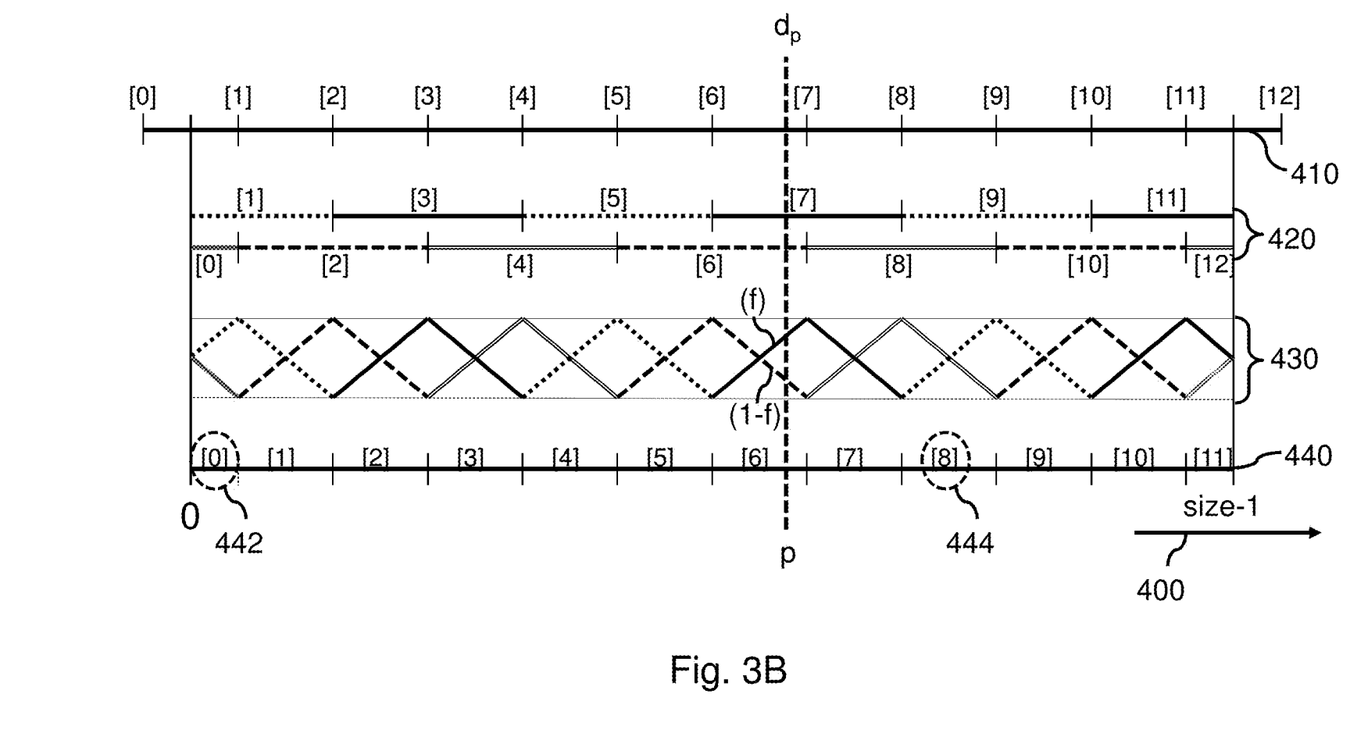
FIG. 3B shows a detailed example illustrating bin addressing and associated weights for both the splatting operation and the interpolation operation.

FIG. 3B shows more details of a similar embodiment, but applied to the accumulation of weighted depth values and weights in respective volumes, namely the aforementioned sum-of-weighted depth volume and the sum-of-weights volume.

In this example, both volumes have a fixed maximum size of 18×12×18 bins (X, Y, I) irrespective of the image's size, while the actual number of bins which are may vary. Namely, a "sizeBinK" parameter may be used in the splatting operation to define the size of a non-edge bin 444 and thus determine how many bins are used. This size which may be a power of 2 to reduce the complexity of the implementation. The size of the two bins at the edge of a dimension "edgeBinK" may vary to allow any value of the dimension size. FIG. 3B shows a lower edge bin 442. For example, if the image width is 480 and sizeBinX is selected to be 32, there may be 14 non-edge bins and 2 edge bins each having a width of (480−14*32)/2=16. In another example, if the image height is 270 and sizeBinY is 32, the width of each of the edge bins may be (270−8*32)/2=7. As such, the use of edge bins allows the non-edge bins to have a size equal to a power-of-2, thereby simplifying the implementation complexity. Namely, normalization in fixed point arithmetic may be performed by a simple shift operation. In addition, using two edge bins (at the upper and lower end) has shown to yield better filter results as the edge bins coincide with the edges of the image. It may thus be desirable to have edge bins of a certain size on purpose. For example, it has been found that edge bins being half-size of a regular non-edge bin may be preferred, while having at the minimum half-size of the regular bin size and at the maximum ¾ of the regular bin size.

FIG. 3B further shows an example of the bin addressing and associated weights for both the splatting and the depth interpolation. For ease of understanding, FIG. 3B may show a single dimension only. This dimension can be either the X, Y of the image position, or the range dimension. Specifically, FIG. 3B shows the position 410 of depth samples at the indicated index positions [0] . . . [12], e.g., corresponding to the positions of samples along a line in the input depth map, e.g. as obtained from the template depth data 024 of FIG. 1. For each index position, a corresponding splat accumulation interval 420, a weight determined by a weight function 430 for the splatting and the depth profile interpolation (indicated by reference numeral 170 in FIG. 1), and a bin interval 440 are shown. FIG. 3B is to be interpreted as follows. For a given index position, e.g., index position [7], an accumulation interval is defined which is denoted by the same numeral [7], as well as a corresponding weight function 430 which is shown in the same line-style as the accumulation interval [7]. The weight function 430 represents a weight "f" which linearly transitions from 0 from the edges of the accumulation interval [7] to 1 at the center of the accumulation interval [7]. Within the same accumulation interval [7], also a weight "1−f" is shown which, in the left-half of the accumulation interval [7], represents a weight for the depth sample [6] in its halfway-overlapping accumulation interval [6], and on the right-half of the accumulation interval [7], represents a weight for the depth sample [8] in its halfway-overlapping accumulation interval [8].

It can be seen that the accumulation intervals and weights are selected such that, for a given position p along the shown dimension, the bins of the sum-of-weights volume may be accumulated in accordance with SW[x]+=f and SW[x+1]+=(1−f) whereas the bins of the sum-of-weighted-depths volume may be accumulated in accordance with SWD[x]+=f*$d_p$ and SWD[x+1]+=(1−f)*$d_p$. Here, the position p determines the bin x, being [6] in this example, and the depth value $d_p$ is obtained by depth profile interpolation ('170' in FIG. 1) from the depth map D in accordance with $d_p$=(1−f)*D[x]+f*D[x+1]. It is noted that this may be only for a single dimension; typically, the addressing of the bins is based on the spatial dimensions X, Y and one or more range dimensions I of the image, and thereby typically depends also on the image data itself.

Figure 5:
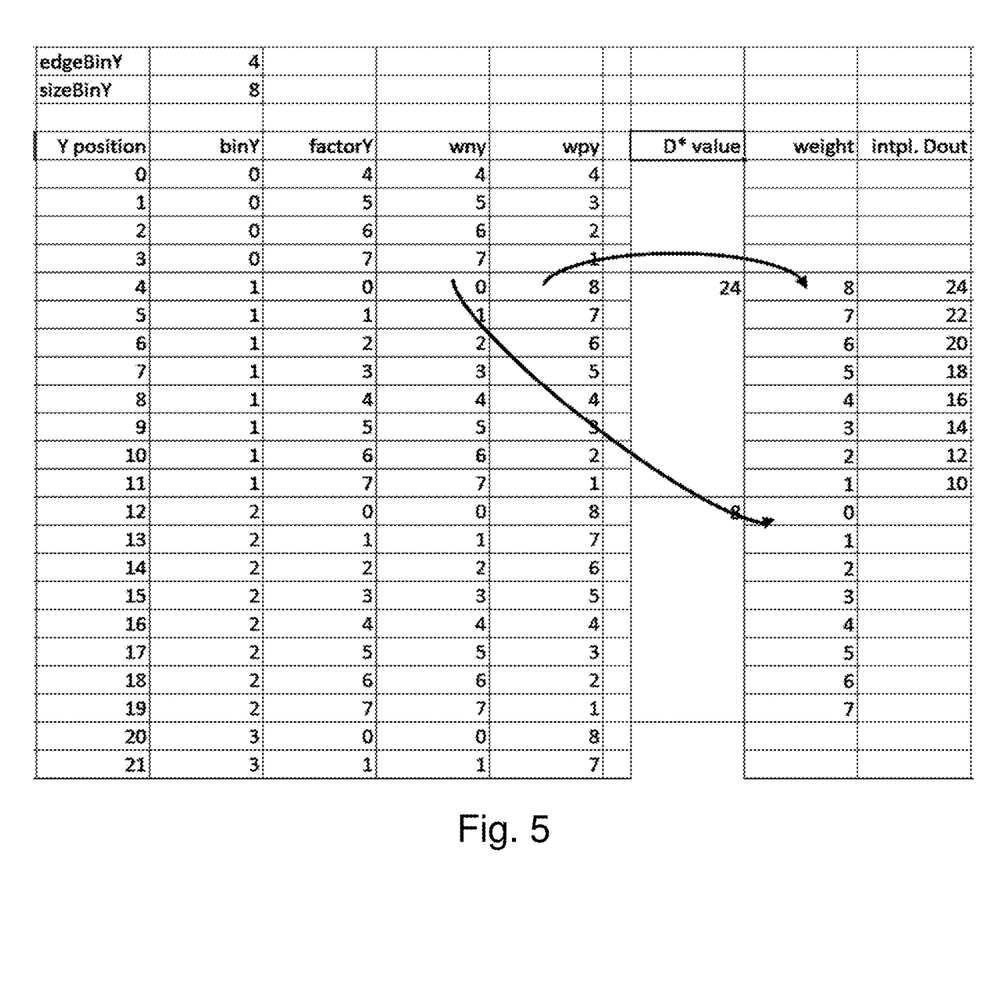
FIGS. 5 to 7 illustrates various aspects of the interpolation operation

It is noted that the weights 'f' and '(1−f)' may be computed as fixed-point values with normalized expressions. For example, in case of 3 bits after the binary dot, the value of 8 represents '1' and thus 'f' is in range [0 . . . 8]. In a specific example, if one were to assume that dp=(f−1)*D[x]+f*D[x+1] is to be computed, with D[x] being 24, D[x+1] being 8 and f being 6, 'dp' may be computed as ((8−6)*24+6*8)/8=96/8=12. The division by 8 is a normalization step. This example is also shown in the table of FIG. 5 on Y position 10. In this and other Figures and throughout the text, 'wny' and 'wpy' represent the fixed-point values of 'f' and '(1−f)' before this normalization.

In a specific and efficient embodiment, the maximum weight may correspond to the size of the bins, e.g., 8 for a bin-size of 8. Accordingly, each step in luminance value results in a step in weight for each of the two adjacent bins. Similarly, each step in (x or y) position results in a step in weight for each of the two respective adjacent bins.

Figure 4:
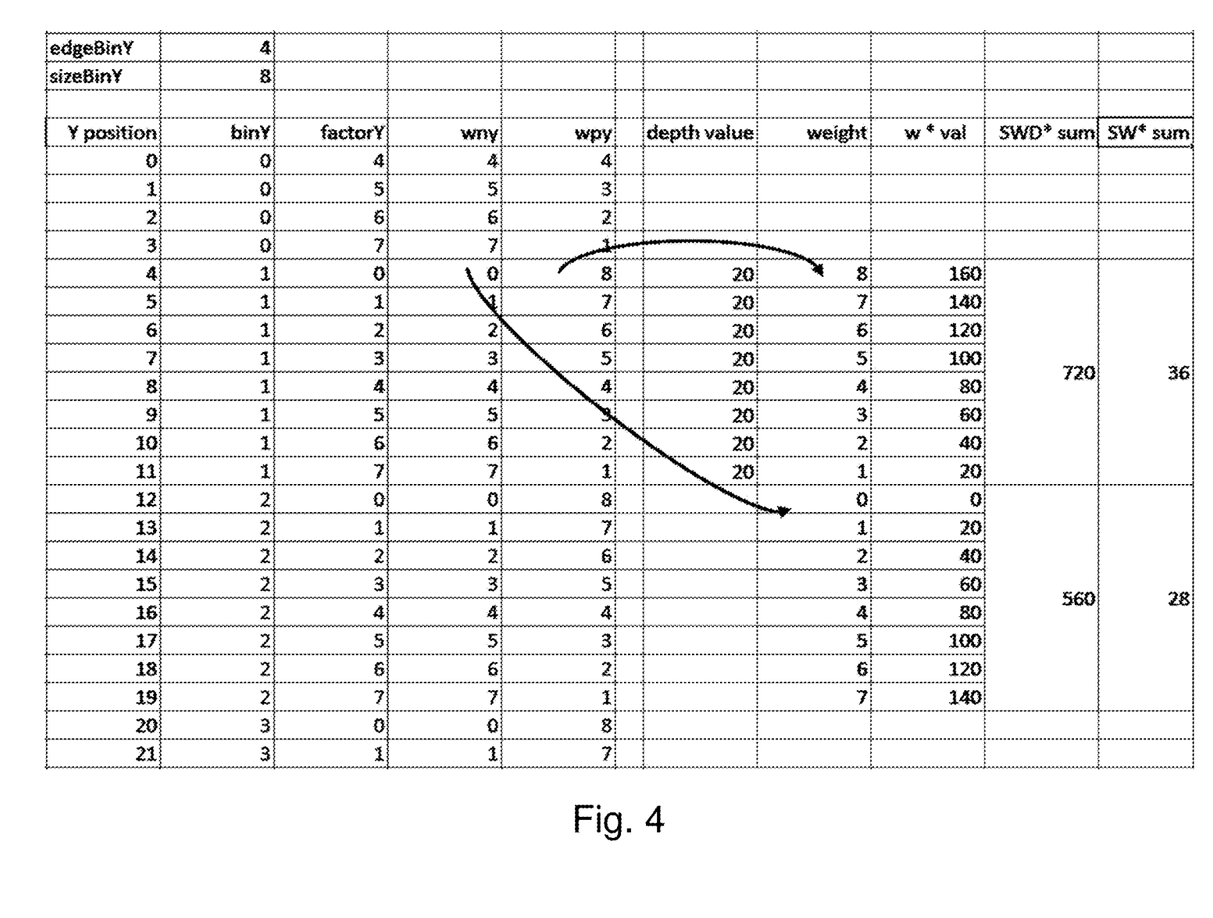
FIG. 4 illustrates various aspects of the splatting operation.

FIG. 4 illustrates the splatting operation filling the sum-of-weighted-depths (SWD) and the sum-of-weights (SW) along a single dimension. In this example, the vertical Y axis is chosen, with the size of bins being 8 ("sizeBinY") and the first bin having a size of 4 ("edgeBinY"). The "Yposition" is simply the line number. The table in FIG. 4 shows the interpolation with respect to the lines in the binY with index 1. The "factorY" is the relative position of a line within a bin. Based on the "factorY" value, two weights "wpy" and "wny" are derived, which relate to the complementary weights "f" and "1−f" as described for FIG. 3B but now expressed as a weight "wny" for the 'next' bin and a weight "wpy" for the 'present' bin, with 'next' and 'present' referring to two consecutive and spatially adjacent bins. Splatting is essentially a down-sampling function by which a high resolution input is transformed into a low resolution output. In this example, all or most lines within the binY number 1 have an input depth value "20". Depending on the line position, the weight gradually shifts from bin 1 to bin 2. As such, on line number 4 (which is the first line in bin 1), the complete value is accumulated to bin 1 and none or few of the value is added to bin 2, which is illustrated in FIG. 4 by the two arrows. On line number 8 (halfway the bin), 50% of the value is added to bin 1 and 50% is added to bin 2. This way, a linear fade-over between the bins is achieved. Using the weights, the cells of the SW (sum-of-weights) volume may only accumulate the applied weights, whereas the cells of the SWD (sum-of-weighted-depths) volume accumulate the depth value multiplied by the weight ("weighted depth").

In summary, the splatting operation may involve, for each pixel in the image, determining a coordinate of the pixel in the coordinate system of the image, e.g., in the form of a (X, Y, I) coordinate, a (X, Y, R, G, B) coordinate or a (X, Y, I, U, V) coordinate. In the latter, (I, U, V) refers to the components of a YUV signal, with the Y (luminance) component being referred to as I (Intensity) to distinguish from the Y spatial dimension. It may then be determined which adjacent cells in the sum-of-weights volume represent accumulation intervals associated with the pixel. A depth value of the pixel may be obtained from the depth map, possibly using interpolation if the depth map has a lower spatial resolution than the image. For each of the adjacent cells, a weight may be obtained for weighting the depth value. The weight may be (pre)calculated based on a relative position of the pixel with respect to the accumulation interval of a respective cell as indicated by the coordinate. The depth value may then be weighted by the weight and accumulated in the respective cell of the sum-of-weighted-depths volume, with the weight itself being accumulated in a corresponding cell of the sum-of-weights volume.

It is noted that for a single dimension, a linear interpolation may require 2 values. Similarly, for two dimensions, a bi-linear interpolation may require 4 values. For the volume of 3 dimensions, a tri-linear interpolation uses 8 values. The weights may be pre-calculated values as a function of the relative position of a sample within a bin. In case the depth map has a reduced spatial resolution with respect to the image, and in particular the same reduced spatial resolution as the sum-of-weighted-depths volume and the sum-of-weights volume, the depth map may be interpolated before the splatting operation to the image resolution using the same weights as used in the splatting operation. This is illustrated in FIG. 1 by the weighting block 150 providing weight data 054 to the 2D interpolation block 170 which interpolates the depth template to image resolution.

Having performed the splatting operation, a slicing operation may be performed to obtain an image-adapted depth volume. This slicing operation may be performed by a microprocessor configured by software, which is not shown explicitly in FIG. 1 but which may have access to the memory, e.g., via DMA communication. The slicing operation may include, for each cell of the sum-of-weighted-depths volume and corresponding cell of the sum-of-weights volume, dividing the accumulated weighted depth values by the accumulated weights. As a result of this division, each bin now contains an image-adapted depth value, with the overall volume thus representing an image-adapted depth volume.

Having performed the slicing operation, an interpolation operation may be performed to obtain an image-adapted depth value of the image-adapted depth map for each pixel in the image. This interpolation operation may include identifying adjacent cells in the image-adapted depth volume on the basis of the cells representing accumulation intervals for the pixel in the sum-of-weighted-depths volume on the basis of the coordinate of the pixel, and applying an interpolation filter to the adjacent cells of the image-adapted depth volume, wherein the interpolation filter includes, for each of the cells, a weight which is determined based on the relative position of the pixel with respect to the accumulation interval of a respective cell as indicated by the coordinate. In other words, the position of a pixel, as determined by its spatial coordinate and its range value(s), may determine the bins to be used in the interpolation, whereas the relative position of a pixel in a bin may determine the interpolation weights. The weights may be pre-calculated. In particular, the weights may be the same weights as also used in the splatting operation, and/or a same hardware circuit may be used to store or calculate the weights.

FIG. 5 illustrates the interpolation operation in a similar manner as FIG. 4 did for the splatting operation. Here, the weights are used to interpolate an output depth value from the image-adapted depth volume. As can be seen when comparing FIG. 5 with FIG. 4, the same weights are used for a particular relative position within a bin. This is illustrated in FIG. 1 by the weighting block 150 providing the same weight and volume index data 052 to the interpolation block 160 as to the splatting block 140. The right-hand part of the table shows how the weights are applied on input depth values 24 and 8. For example, the interpolation on Y position 7 yields ((5×24+3×8))/8=18.

Figure 6:
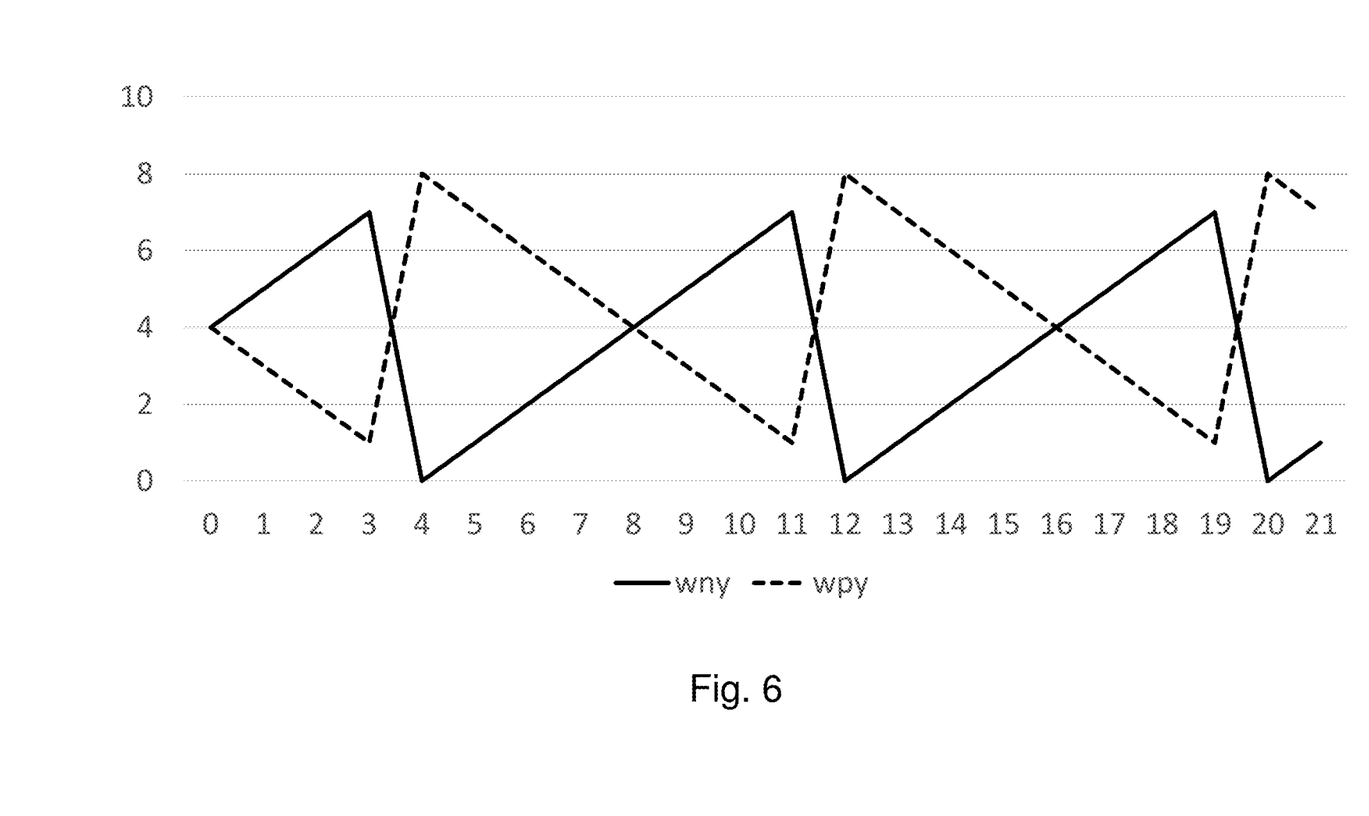
Figure 7:
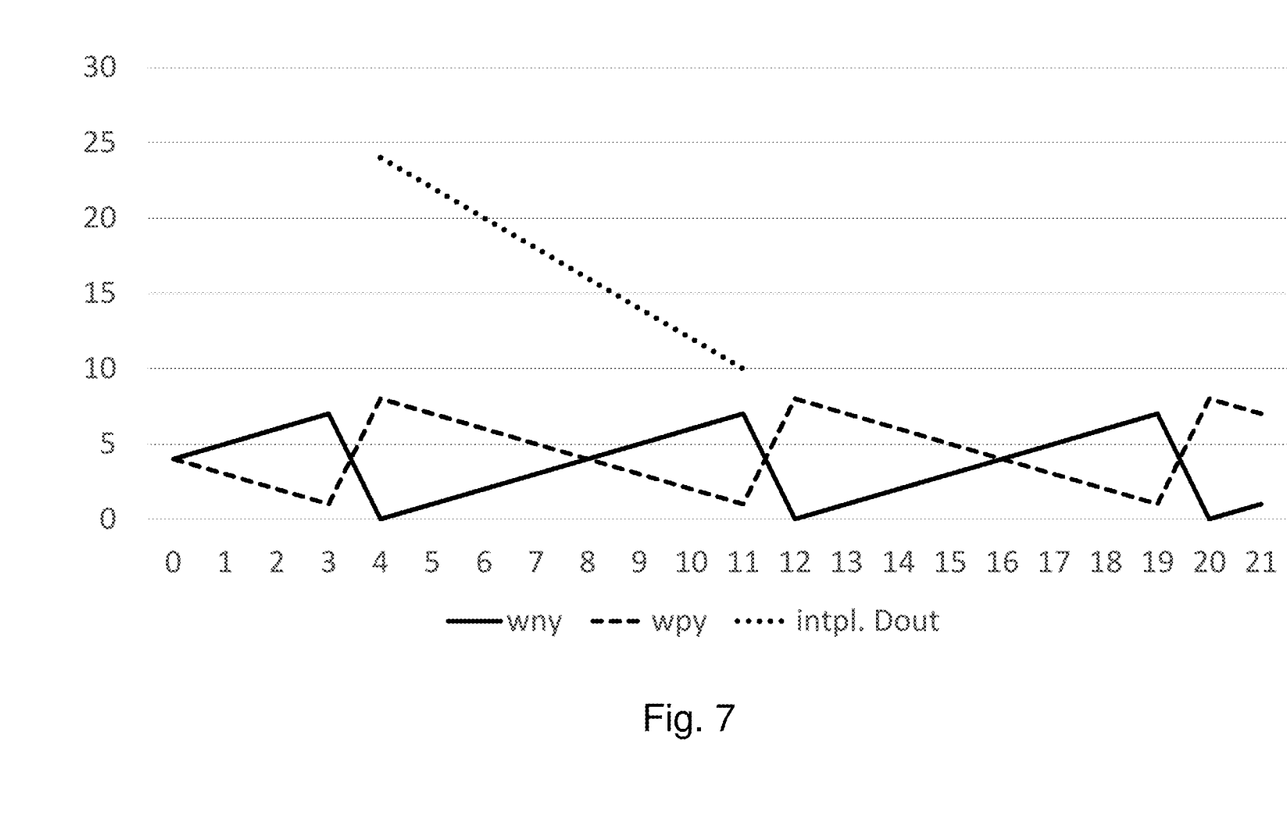

FIG. 6 graphically shows the two weights used in FIGS. 4 and 5, namely the value of "wpy" and "wpy" on the vertical axis, as a function of the line number Y on the horizontal axis. The weight "wpy" is applied on the "present" value, whereas weight "wny" is applied on the "next" value. FIG. 7 corresponds to FIG. 6 but additionally shows the interpolated output as obtained between the input depth values 24 and 8 as shown in FIG. 5—it can be seen that the weights are calculated so as to provide a linear fading between the input depth values. In addition to linear fading, also higher-order interpolation functions may be used, e.g., cubic or spline interpolations.

In general, it is noted that the size of bins in the X or Y dimension of the described volumes may always a power of 2, since in this case the interpolation, being for example a fixed-point tri-linear interpolation, may use a shift operation for normalization, which results in a substantial reduction of hardware cost. This may result in a variable number of bins which are needed depending on the image size. With changing bin size, the filter performance may be influenced. However, experiments show that this does not significantly impacted the visual performance. Moreover, using a variable number of bins instead of a fixed number of bins does not significantly affect the hardware design. The size of a bin in either X or Y dimension may specified by a hardware parameter, while the analysis of which value to select may be left to, e.g., software of a microprocessor.

It will be appreciated that, in general, the processing subsystem may be provided separately of the described integrated circuit, e.g., in another type of SoC.

Data may be provided on a computer readable medium which defines the processing subsystem in the form of netlists and/or synthesizable RTL. The computer readable medium, and thereby the data stored thereon, may be transitory or non-transitory. For example, the processing subsystem may be provided as a synthesizable core, e.g., in a hardware description language such as Verilog or VHDL, or as generic gate-level netlists providing a boolean-algebra representation of the RTC IP block's logical function implemented as generic gates or process specific standard cells.

The term 'map' refers to data arranged in rows and columns. Moreover, the adjective 'depth' is to be understood as being indicative of the depth of portions of an image to the camera. Therefore, the depth map may be constituted by depth values, but also by, e.g., disparity values or parallactic shift values. Essentially, the depth map may therefore constitute a disparity map or a parallactic shift map. Here, the term disparity refers to a difference in position of an object when perceived with a left eye or a right eye of the user. The term parallactic shift refers to a displacement of the object between two views so as to provide the disparity to the user. Disparity and parallactic shift are generally negatively correlated with distance or depth. Device and methods for conversion between all or most of the above types of maps and/or values are known.

Figure 8:
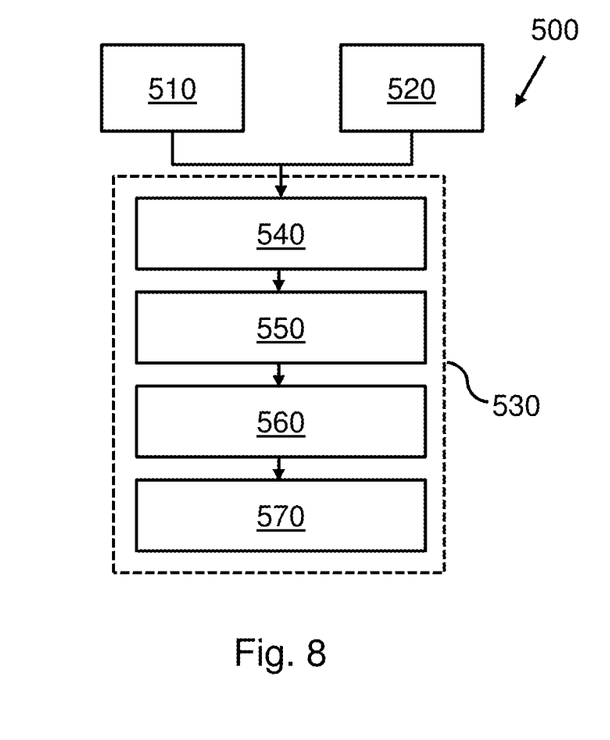
FIG. 8 shows a method for estimating a depth map from an image.

FIG. 8 shows a computer-implemented method 500 for estimating a depth map from an image. The method 500 is shown to include, in an operation titled "ACCESSING IMAGE DATA", accessing 510 image data of the image, in an operation titled "ACCESSING DEPTH DATA", accessing 520 depth data of a template depth map, in an operation titled "APPLYING JOINT BILATERAL FILTER", applying 530 a joint bilateral filter to the template depth map using the image data as a range term in the joint bilateral filter, thereby obtaining an image-adapted depth map as output, wherein the applying the joint bilateral filter includes, in an operation titled "INITIALIZING VOLUMES", initializing 540 a sum-of-weighted-depths volume and a sum-of-weights volume as respective data empty structures in a memory, in an operation titled "SPLATTING OPERATION", performing 550 a splatting operation to fill the volumes, in an operation titled "SLICING OPERATION", performing 560 a slicing operation to obtain an image-adapted depth volume, and in an operation titled "INTERPOLATION OPERATION", performing 570 an interpolation operation to obtain an image-adapted depth value of the image-adapted depth map for each pixel in the image. It will be appreciated that the above operation may be performed in any suitable order, e.g., consecutively, simultaneously, or a combination thereof, subject to, where applicable, a particular order being necessitated, e.g., by input/output relations. For example, operations 510 and 520 may be performed in parallel or sequentially.

Figure 9:
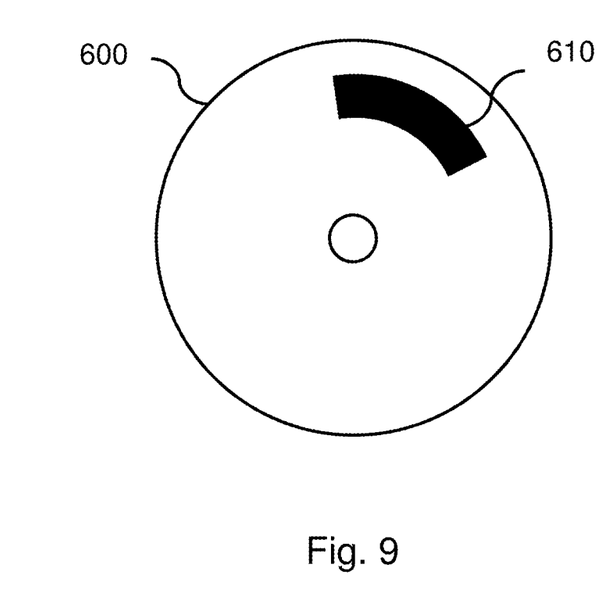
FIG. 9 shows a computer-readable medium including instructions for causing a processor system to perform the method.

The method 500 may be implemented on a processor system, e.g., on a computer as a computer implemented method, as dedicated hardware, or as a combination of both. As also illustrated in FIG. 9, instructions for the computer, e.g., executable code, may be stored on a computer readable medium 600, e.g., in the form of a series 610 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 600.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. The presently disclosed subject matter may be implemented by hardware including several distinct elements, and by a suitably programmed computer. In the device claim enumerating several distinct elements, several of these distinct elements may be embodied by one and the same item of hardware. The mere fact that certain measures are recited in mutually different dependent claims does not indicate that a combination of these measures cannot be used to advantage.

The invention claimed is:

1. An integrated circuit configured to estimate a depth map from an image, the integrated circuit including or being connected to a memory, the integrated circuit comprising:
   an image data interface configured to access image data of the image;
   a depth data interface configured to access depth data of a template depth map, the template depth map representing a template which is to be adapted to the image data; and
   a processing subsystem configured to apply a joint bilateral filter to the template depth map using the image data as a range term in the joint bilateral filter, thereby obtaining an image-adapted depth map as output,
   wherein the processing subsystem is configured to implement the joint bilateral filter by:
   initializing a sum-of-weighted-depths volume and a sum-of-weights volume as respective empty data structures in the memory, each of the volumes including:
      two spatial dimensions representing a down-sampled version of the two spatial dimensions of the image data, and
      at least one range dimension representing a down-sampled version of a range dimension of an image component of the image data,
      wherein the cells of the volumes define bins in a coordinate system of the image which is defined with respect to the two spatial dimensions of the image and the range dimension of the image data,
   performing a splatting operation to fill the volumes, wherein the splatting operation includes, for each pixel in the image:
      identifying adjacent bins in the sum-of-weighted-depth volume to which the pixel contributes in the splatting operation based on a coordinate of the pixel in the coordinate system of the image, the coordinate being indicative of a relative position of the pixel with respect to the bins of each of the volumes, and
      obtaining a depth value of the pixel from the template depth map, and
      for each of the adjacent bins:
         obtaining a splatting weight for weighting the depth value, wherein the splatting weight determines a contribution of the pixel to a respective bin and is determined based on the relative position of the pixel with respect to the respective bin,
         weighting the depth value by the splatting weight, and
         accumulating the weighted depth value in the respective bin of the sum-of-weighted-depths volume, and accumulating the splatting weight in a corresponding bin of the sum-of-weights volume,
   performing a slicing operation to obtain an image-adapted depth volume by, for each bin of the sum-of-weighted-depths volume and corresponding bin of the sum-of-weights volume, dividing the accumulated weighted depth values by the accumulated weights,
      performing an interpolation operation to obtain an image-adapted depth value of the image-adapted depth map for each pixel in the image, wherein the interpolation operation includes:
         based on the coordinate of the pixel in the coordinate system of the image, identifying adjacent bins in the image-adapted depth volume on the basis of the pixel contributing to corresponding bins of the sum-of-weighted-depth volume during the splatting operation, and
         applying an interpolation filter to the adjacent bins of the image-adapted depth volume, wherein the interpolation filter comprises, for each of the adjacent bins, an interpolation weight which is determined based on the relative position of the pixel with respect to the respective bin.

2. The integrated circuit according to claim 1, wherein the processing subsystem includes an application-specific hardware circuit and a microprocessor configurable by software, wherein:
   the application-specific hardware circuit is configured to perform the splatting operation and the interpolation operation, and
   the microprocessor is configured by the software to, during operation of the integrated circuit, perform the slicing operation.

3. The integrated circuit according to claim 2, wherein the application-specific hardware circuit includes a filter table for storing the splatting weights used in the splatting operation and/or the interpolation weights used in the interpolation operation.

4. The integrated circuit according claim 3, wherein the filter table is loaded with the splatting weights used in the splatting operation and the interpolation weights used in the interpolation operation before performing the respective operation.

5. The integrated circuit according to claim 1, wherein the splatting weights used in the splatting operation and the interpolation weights used in the interpolation operation are the same.

6. The integrated circuit according to claim 1, wherein the splatting weights used in the splatting operation and the interpolation weights used in the interpolation operation represent a linear interpolation with respect to the coordinate system of the image.

7. The integrated circuit according to claim 2, wherein the microprocessor is configured by the software to, during operation of the integrated circuit, apply a temporal filtering to the sum-of-weighted-depths volume and to the sum-of-weights volume before performing the slicing operation.

8. The integrated circuit according to claim 7, wherein the temporal filtering is a first- or higher-order infinite impulse response filter.

9. The integrated circuit according to claim 1, wherein the processing subsystem is configured to, after performing the splatting operation, convolute the sum-of-weighted-depths volume with a Gaussian kernel.

10. The integrated circuit according to claim 1, wherein the integrated circuit is or is part of a field-programmable gate array.

11. The integrated circuit according to claim 1, wherein the integrated circuit is or is part of a system-on-chip.

12. A device comprising the integrated circuit according to claim 1.

13. The device according to claim 12, being a display device or set-top box.

14. A computer-implemented method for estimating a depth map from an image, the method comprising:
   accessing image data of the image;
   accessing depth data of a template depth map, the template depth map representing a template which is to be adapted to the image data; and
   applying a joint bilateral filter to the template depth map using the image data as a range term in the joint bilateral filter, thereby obtaining an image-adapted depth map as output, wherein the applying the joint bilateral filter includes:

initializing a sum-of-weighted-depths volume and a sum-of-weights volume as respective empty data structures in a memory, each of said volumes including:
  two spatial dimensions representing a down-sampled version of the two spatial dimensions of the image data, and
  at least one range dimension representing a down-sampled version of a range dimension of an image component of the image data,
  wherein the cells of the volumes define bins in a coordinate system of the image which is defined with respect to the two spatial dimensions of the image and the range dimension of the image data,
performing a splatting operation to fill the volumes, wherein the splatting operation includes, for each pixel in the image:
  identifying adjacent bins in the sum-of-weighted-depth volume to which the pixel contributes in the splatting operation based on a coordinate of the pixel in the coordinate system of the image, the coordinate being indicative of a relative position of the pixel with respect to the bins of each of the volumes, and
  obtaining a depth value of the pixel from the template depth map, and
  for each of the adjacent bins:
    obtaining a splatting weight for weighting the depth value, wherein the splatting weight determines a contribution of the pixel to a respective bin and is determined based on the relative position of the pixel with respect to the respective bin,
    weighting the depth value by the splatting weight, and
    accumulating the weighted depth value in the respective bin of the sum-of-weighted-depths volume, and accumulating the splatting weight in a corresponding bin of the sum-of-weights volume,
performing a slicing operation to obtain an image-adapted depth volume by, for each bin of the sum-of-weighted-depths volume and corresponding bin of the sum-of-weights volume, dividing the accumulated weighted depth values by the accumulated weights, and
performing an interpolation operation to obtain an image-adapted depth value of the image-adapted depth map for each pixel in the image, wherein the interpolation operation includes:
  being based on the coordinate of the pixel in the coordinate system of the image, identifying adjacent bins in the image-adapted depth volume on the basis of the pixel contributing to corresponding bins of the sum-of-weighted-depths volume during the splatting operation, and
  applying an interpolation filter to the adjacent bins of the image-adapted depth volume, wherein the interpolation filter includes, for each of the adjacent bins, an interpolation weight which is determined based on the relative position of the pixel with respect to the respective bin.

15. A non-transitory computer readable medium, comprising data representing instructions arranged to cause a processor system to perform the method according to claim 14.

* * * * *